(12) United States Patent
Zhang et al.

(10) Patent No.: US 8,405,244 B2
(45) Date of Patent: Mar. 26, 2013

(54) SYSTEM AND METHOD FOR UMBRELLA POWER GENERATION

(75) Inventors: Jianjun Zhang, Cupertino, CA (US); Nanzhi Zou, Fremont, CA (US); Wang-Long Zhou, Andover, MA (US)

(73) Assignee: Skywind, Inc., Fremont, CA (US)

( * ) Notice: Subject to any disclaimer, the term of this patent is extended or adjusted under 35 U.S.C. 154(b) by 429 days.

(21) Appl. No.: 12/754,879

(22) Filed: Apr. 6, 2010

(65) Prior Publication Data

US 2010/0276941 A1 Nov. 4, 2010

Related U.S. Application Data

(60) Provisional application No. 61/215,201, filed on May 4, 2009, provisional application No. 61/215,202, filed on May 4, 2009, provisional application No. 61/215,204, filed on May 4, 2009.

(51) Int. Cl.
*F03D 9/00* (2006.01)

(52) U.S. Cl. ........................................................ 290/55

(58) Field of Classification Search .................... 290/55, 290/54

See application file for complete search history.

(56) References Cited

U.S. PATENT DOCUMENTS

| | | | | |
|---|---|---|---|---|
| 5,213,122 A | * | 5/1993 | Grady, II | 135/20.3 |
| 5,291,908 A | * | 3/1994 | Grady, II | 135/22 |
| 6,058,951 A | * | 5/2000 | Wilson | 135/20.3 |
| 6,129,101 A | * | 10/2000 | Dubinsky | 135/20.3 |
| 6,555,931 B2 | * | 4/2003 | Mizzi | 290/54 |
| 7,183,663 B2 | | 2/2007 | Roberts et al. | |
| 7,188,808 B1 | * | 3/2007 | Olson | 244/153 R |
| 7,504,741 B2 | * | 3/2009 | Wrage et al. | 290/55 |
| 8,018,079 B2 | * | 9/2011 | Kelly | 290/1 R |
| 2002/0033019 A1 | | 3/2002 | Mizzi | |
| 2004/0055627 A1 | * | 3/2004 | P. Moga | 135/16 |
| 2007/0120004 A1 | | 5/2007 | Olson | |
| 2008/0231058 A1 | * | 9/2008 | Nicholson et al. | 290/55 |
| 2009/0097974 A1 | | 4/2009 | Ippolito et al. | |
| 2010/0032949 A1 | * | 2/2010 | Varrichio et al. | 290/44 |

FOREIGN PATENT DOCUMENTS

| | | | |
|---|---|---|---|
| CN | 2 426 024 | | 4/2001 |
| CN | 2906118 Y | * | 5/2007 |
| DE | 4242065 A1 | * | 10/1993 |
| DE | 4300789 A1 | * | 10/1993 |
| DE | 102008047261 A1 | * | 4/2010 |
| NL | 1017171 C6 | * | 7/2002 |

OTHER PUBLICATIONS

International Search Report and Written Opinion of PCT/US2010/030071 dated May 3, 2011.
http://www.skywindpower.com/ww/index.htm; Potentially Our Cheapest Energy Source, retrieved from Internet on Jun. 10, 2011.
http://www.magenn.com/; "Magenn Wind Power Anywhere", retrieved from Internet on Jun. 10, 2011.
www.makanipower.com; "Energy Systems" retrieved from Internet on Jun. 10, 2011.

(Continued)

*Primary Examiner* — Joseph Waks
(74) *Attorney, Agent, or Firm* — Hamilton, Brook, Smith & Reynolds, P.C.

(57) ABSTRACT

There is provided a mechanism for opening and closing a working umbrella of a kite-guided umbrella ladder system. The umbrella ascends when in an open state and descends when in a closed state. Huge pulling power is introduced by the working umbrella when it is ascending, which can be used for power generation. A system with a common rail tether and multiple working umbrellas is provided for efficient and large scale power generation.

60 Claims, 12 Drawing Sheets

OTHER PUBLICATIONS http://www.kitegen.com/en/ "Electrical Access: The Raw Material for Democracy", retrieved from Internet on Jun. 10, 2011.

International Preliminary Report on Patentability from PCT/US2010/030071 dated Nov. 17, 2011.

\* cited by examiner

SYSTEM AND METHOD FOR UMBRELLA POWER GENERATION

RELATED APPLICATIONS

This application claims the benefit of U.S. Provisional Application No. 61/215,201, filed on May 4, 2009, and claims the benefit of U.S. Provisional Application No. 61/215,202, filed on May 4, 2009, and claims the benefit of U.S. Provisional Application No. 61/215,204, filed on May 4, 2009. The entire teachings of the above applications are incorporated herein by reference.

BACKGROUND OF THE INVENTION

Due to the need for inexpensive power generation and concerns about supplies of fossil fuels and the environmental consequences of their use, there is an ongoing need for sources of power generation that are clean, inexpensive and environmentally friendly. The use of wind power holds promise to satisfy these needs, but there is an ongoing need for wind power generation techniques that are of high power and that have consistent power output.

SUMMARY OF THE INVENTION

In accordance with an embodiment of the invention, there is provided a system for power generation from a fluid. The system comprises a rail tether; and a working umbrella movably mounted to the rail tether such that the working umbrella is powered by the fluid in a first direction along the rail tether during a working stroke of the working umbrella. A working tether couples the working umbrella to a generator during at least the working stroke of the working umbrella. A motor is coupled to the working umbrella during at least a recovery stroke of the working umbrella, the recovery stroke being in an opposite direction to the first direction along the rail tether.

In further, related embodiments, the fluid may comprise air or water. The system may comprise more than one working umbrella movably mounted to the rail tether, each working umbrella being coupled to its own working tether during at least a working stroke of each working umbrella and being coupled to at least one motor during at least a recovery stroke of each working umbrella. The working strokes of the more than one working umbrellas may be out of phase with each other. Each working umbrella may be movably mounted to a different portion of the rail tether. The system may further comprise an airborne guidance device coupled to the rail tether. The airborne guidance device may comprise a kite or a balloon. The system may further comprise a balancing umbrella, the balancing umbrella being fixed in position along the rail tether.

In further related embodiments, the system may further comprise a mechanism to close the working umbrella at the end of the working stroke. The mechanism to close the working umbrella may comprise: an upper stopper; an upper slider coupled to a center of the working umbrella; and a lower slider coupled to at least one string of a periphery of the working umbrella. The upper slider may comprise a magnet and the lower slider may comprise a magnet. The upper slider may comprise a movable tip mechanism. The system may further comprise a mechanism to open the working umbrella at the beginning of the working stroke. The mechanism to open the working umbrella may comprise: a lower stopper; a lower slider coupled to at least one string of a periphery of the working umbrella; and an upper slider coupled to a center of the working umbrella. The lower stopper may be dimensioned to allow the lower slider to pass by the lower stopper along the rail tether, but to prevent the upper slider from passing by the lower stopper along the rail tether. The upper stopper may be dimensioned to prevent the upper slider from passing by the upper stopper along the rail tether. The time taken for the working stroke may be 60% or greater of the total time of the working stroke plus the recovery stroke, or may be 80% or greater of the total time of the working stroke plus the recovery stroke, or may be 90% or greater of the total time of the working stroke plus the recovery stroke.

In further related embodiments, the system may comprise more than one rail tether coupled to at least one generator. Each rail tether may comprise a working umbrella movably mounted to each rail tether such that each working umbrella is powered by the fluid in a first direction along each rail tether during a working stroke of each working umbrella. A working tether may couple each working umbrella to the at least one generator during at least the working stroke of each working umbrella; and at least one motor may be coupled to each working umbrella during at least a recovery stroke of each working umbrella, the recovery stroke of each working umbrella being in an opposite direction to the first direction along the rail tether. The system may comprise a rotating stage coupled to the more than one rail tether. At least one gearbox may be coupled to at least one of the working tethers of the system. The gearbox may comprise at least one clutch. The gearbox may comprise a directional clutch to couple the working tether to the generator during the working stroke, and a clutch to couple the motor to the working umbrella during the recovery stroke. The working umbrella may comprise a diameter of at least 5 meters, or may comprise a diameter of at least 10 meters. The system may generate 0.5 MW or more of power, or 1 MW or more of power, or 10 MW or more of power. The system may further comprise an automated control system to control at least one of a length of the working stroke, a length of the recovery stroke, timing of the commencing of the working stroke, timing of the commencing of the recovery stroke, position of the working umbrella along the rail tether, and load balancing of the power delivered by the system. The rail tether may be one of: at least 500 meters in length, at least 2000 meters in length, at least 4000 meters in length, at least 7000 meters in length, and at least 10,000 meters in length. A control tether may be coupled to the working umbrella. For the fluid comprising water, the system may further comprise at least a weight to maintain at least a portion of the system underwater; and at least one of the working umbrella and a balancing umbrella may be shaped to permit passage of waterborne objects through at least a portion of an interior of the least one of the working umbrella and the balancing umbrella.

In a further embodiment according to the invention, there is provided a system for power generation from a fluid. The system comprises a rail tether means for movably mounting a working umbrella means; and the working umbrella means movably mounted to the rail tether means for being powered by the fluid in a first direction along the rail tether means during a working stroke of the working umbrella means. The system further comprises a working tether means for coupling the working umbrella means to a generator during at least the working stroke of the working umbrella means; and a motor coupled to the working umbrella means during at least a recovery stroke of the working umbrella means, the recovery stroke being in an opposite direction to the first direction along the rail tether means.

In further related embodiments, the system may comprise more than one working umbrella means movably mounted to the rail tether means, each working umbrella means being for coupling to its own working tether means during at least a working stroke of each working umbrella means and being for coupling to at least one motor during at least a recovery stroke of each working umbrella means. The system may further comprise a means for closing the working umbrella at the end of the working stroke, and may comprise a means for opening the working umbrella at the beginning of the working stroke.

In another embodiment, there is provided a system for power generation from a fluid. The system comprises a rail tether; a working umbrella movably mountable to the rail tether such that the working umbrella is powered by the fluid in a first direction along the rail tether during a working stroke of the working umbrella; and a working tether, the working umbrella being couplable to a generator by the working tether during at least a working stroke of the working umbrella, and being couplable to a motor by the working tether during at least a recovery stroke of the working umbrella, the recovery stroke being in an opposite direction to the first direction along the rail tether.

Related methods are provided.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Many people have experience with flying kites. A kite can rise virtually as high as a tether allows. Since a typical kite has very limited pulling power due to its limited wind area, a kite tether can typically be held by hand. Once the kite has risen successfully into the air, it can fly stably under proper wind conditions. By contrast, an umbrella, whether round or in another shape, cannot fly like a kite in such a way because an umbrella cannot keep its balance in the air by itself.

In accordance with an embodiment of the invention, there is provided a method of keeping one or more umbrellas open and flying stably in the air. Further, there is provided an umbrella ladder system for harnessing wind power. The system comprises a tether, a kite, and an umbrella ladder having at least one umbrella. The umbrella ladder is guided and stabilized by the kite, which is at the top of the system.

Figure 1:
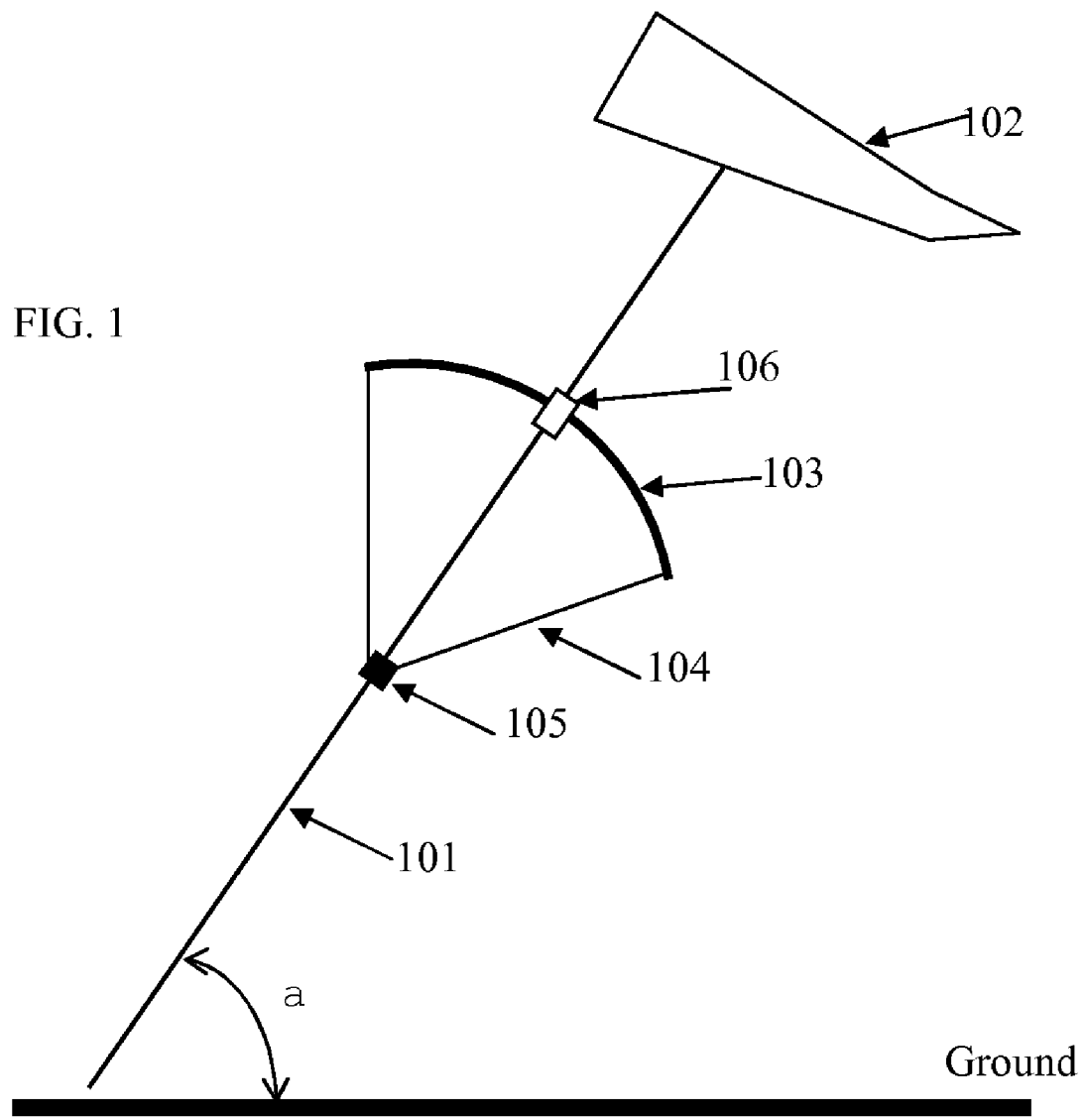
FIG. 1 is a diagram illustrating a technique of stabilizing an umbrella for power generation, in accordance with an embodiment of the invention.

FIG. 1 is a diagram of a simplified embodiment according to the invention, illustrating a technique of stabilizing an umbrella for power generation. In the embodiment of FIG. 1, a tether 101 has one end tied to a kite 102 and another end fixed to a heavy object or a firm post (not shown) on the ground. An umbrella 103 has multiple strings 104 of equal length, which are bound together with the tether 101 at a proper location 105. A tube 106 is attached to the umbrella at its center. The tether 101 goes through the tube 106 so that the umbrella 103 will not fall off. The umbrella 103 can slide freely along the tether 101 in an upwards or downwards direction.

In use of the embodiment of FIG. 1, a proper distance between the kite 102 and the umbrella 103 must be preserved so that the kite 102 can be raised into the air first. While the kite 102 flies stably, the tether 101 is extended gradually until the umbrella 103 is also being pulled up into the air. If the wind is strong enough, the umbrella 103 will be opened by the wind automatically and will remain stably opened. If one were to hold the tether 101 with one's hands, one could feel that a much stronger pulling power is generated by the umbrella 103. A stably flying kite will maintain the tether at an angle "a" relative to the ground. This angle will be smaller when the wind increases and will become larger when the wind decreases.

In the embodiment of FIG. 1, it is the angle "a" that keeps the umbrella tilted toward the wind so that a relatively constant wind force is loaded onto the umbrella, and that keeps the umbrella open and stable. The pulling power of the embodiment of FIG. 1 is proportional to the area of the umbrella 103. However, due to the counterforce applied by the umbrella 103 on the tether 101, it is suggested that the umbrella 103 should have an area not exceeding seven times that of the kite 102, preferably, two to five times that of the kite 102. The foregoing area ratio of the umbrella 103 to the kite 102 is an estimation, and should not be taken as limiting. The shape of the umbrella 103 is preferred, but not limited, to be a round or polygon shape, such as a hexagon or octagon. The number of strings 104 should be not less than three, although other numbers of strings may be used. In the case of a polygon shape, it is preferred to have strings 104 from each corner around the perimeter of the umbrella 103. The material of the umbrella 103 should be durable and flexible. Preferred candidates include, but are not limited to, nylon and terylene.

The tube 106 serves the purpose of allowing the tether to pass through freely, and is not tied to the tether. Any other means, such as chain wheels, may be used to serve the same purpose as the tube 106.

Figure 2:
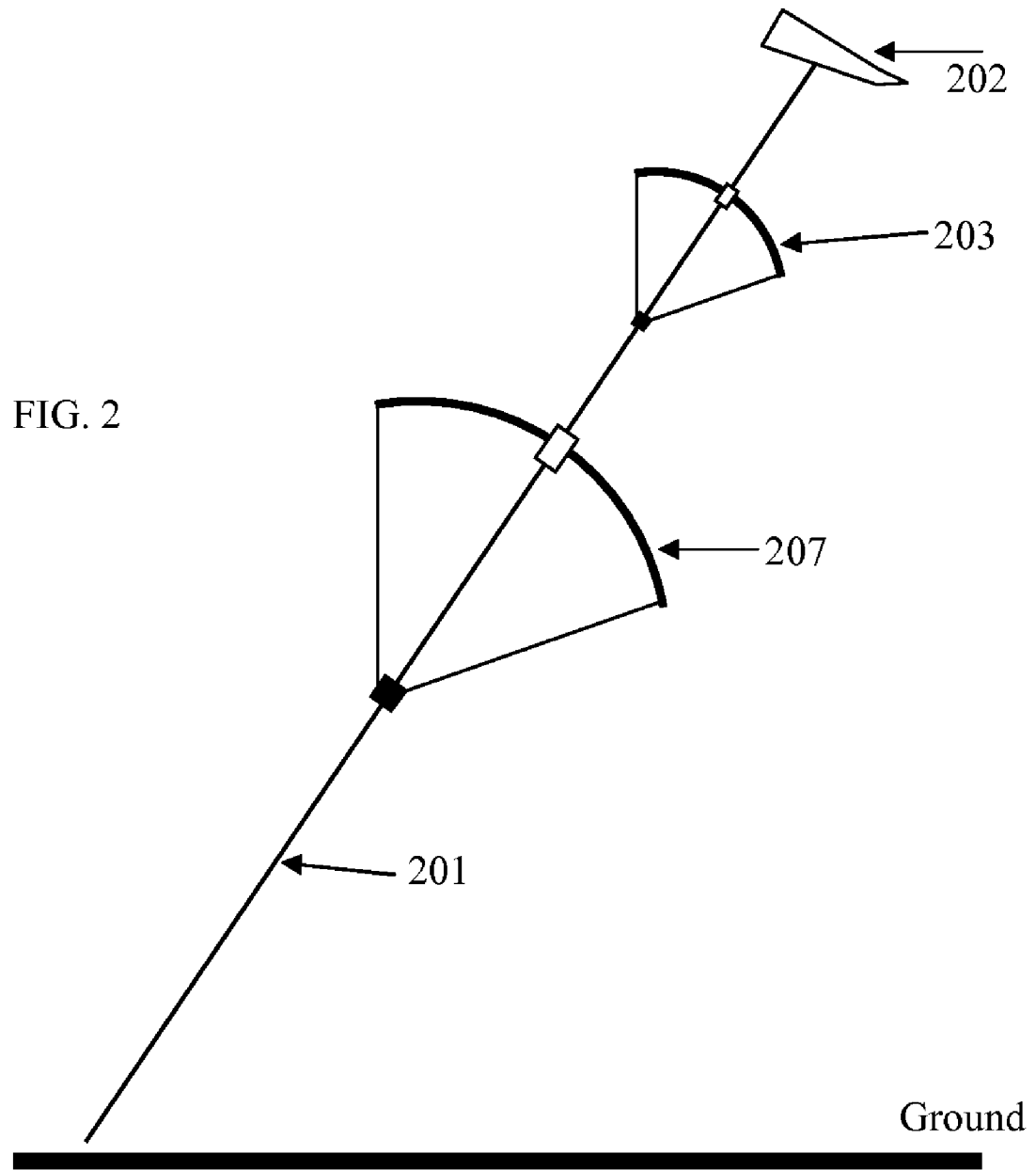
FIG. 2 is a diagram of an umbrella ladder having multiple umbrellas, in accordance with an embodiment of the invention.

FIG. 2 is a diagram of an umbrella ladder having multiple umbrellas, in accordance with an embodiment of the invention. The purpose of having more umbrellas is to increase the umbrella wind area and thereby to generate an even greater pulling power. The embodiment of FIG. 2 comprises a tether 201, a kite 202, a first umbrella 203, and a second umbrella 207. The kite and umbrellas are made of soft and durable materials. The wind area of the first umbrella 203 may be several times bigger than that of the kite 202, and the wind area of the second umbrella 207 may be several times bigger than the sum of the areas of the first umbrella 203 and the kite 202. For example, the first umbrella 203 has an area about two to seven times greater than that of the kite 202, and the second umbrella 207 has an area about two to seven times greater than the sum of the areas of the first umbrella 203 and the kite 202. It should be noted that the area ratio of up to about seven is an estimate, and should not be taken as limiting. Because of the much larger wind area of the second umbrella 207, the pulling power can be increased significantly by comparison with the embodiment of FIG. 1. Although the first umbrella 203 contributes to the total pulling power as well, its major function is to stabilize the second umbrella 207, which is assumed to have a much larger area. Without the first umbrella 203, it might be difficult or even impossible to keep the second umbrella 207 stable in the air, depending on the relative dimensions involved. Because of the much larger wind area of the second umbrella 207 compared to the kite 202, the pulling power generated by the second umbrella 207 could be much bigger than that of the kite 202 alone. Similar considerations apply to a system having three or more umbrellas. It will be appreciated, however, that the relative dimensions of the first and second umbrellas, and any further umbrellas, do not necessarily have to be increased based on the sum of the areas of the other umbrellas in the system; other area ratio schemes may be used. The number of umbrellas may be increased, for example up to tens or even hundreds, as long as the tether is strong enough and long enough, thereby dramatically amplifying the pulling power of the system.

Because of the extremely large pulling power generated by an umbrella ladder in accordance with an embodiment of the invention, wind power can be more efficiently harnessed. Such a ladder system has wide application in power generation and other uses.

In accordance with a further embodiment of the invention, there is provided a mechanism for opening and closing a working umbrella of a kite-guided umbrella ladder system. The umbrella ascends when in an open state and descends when in a closed state. Huge pulling power is introduced by the working umbrella when it is ascending, which can be used for power generation. A system with a common rail tether and multiple working umbrellas is provided for efficient and large scale power generation.

To use umbrella-induced pulling power for wind power generation, an embodiment according to the present invention provides a mechanism to open and close an umbrella in the air and let the umbrella travel up and downward as a complete working and recovery cycle. We here call such an umbrella a working umbrella, as distinct from an umbrella used for a stabilizing purpose.

Figure 3:
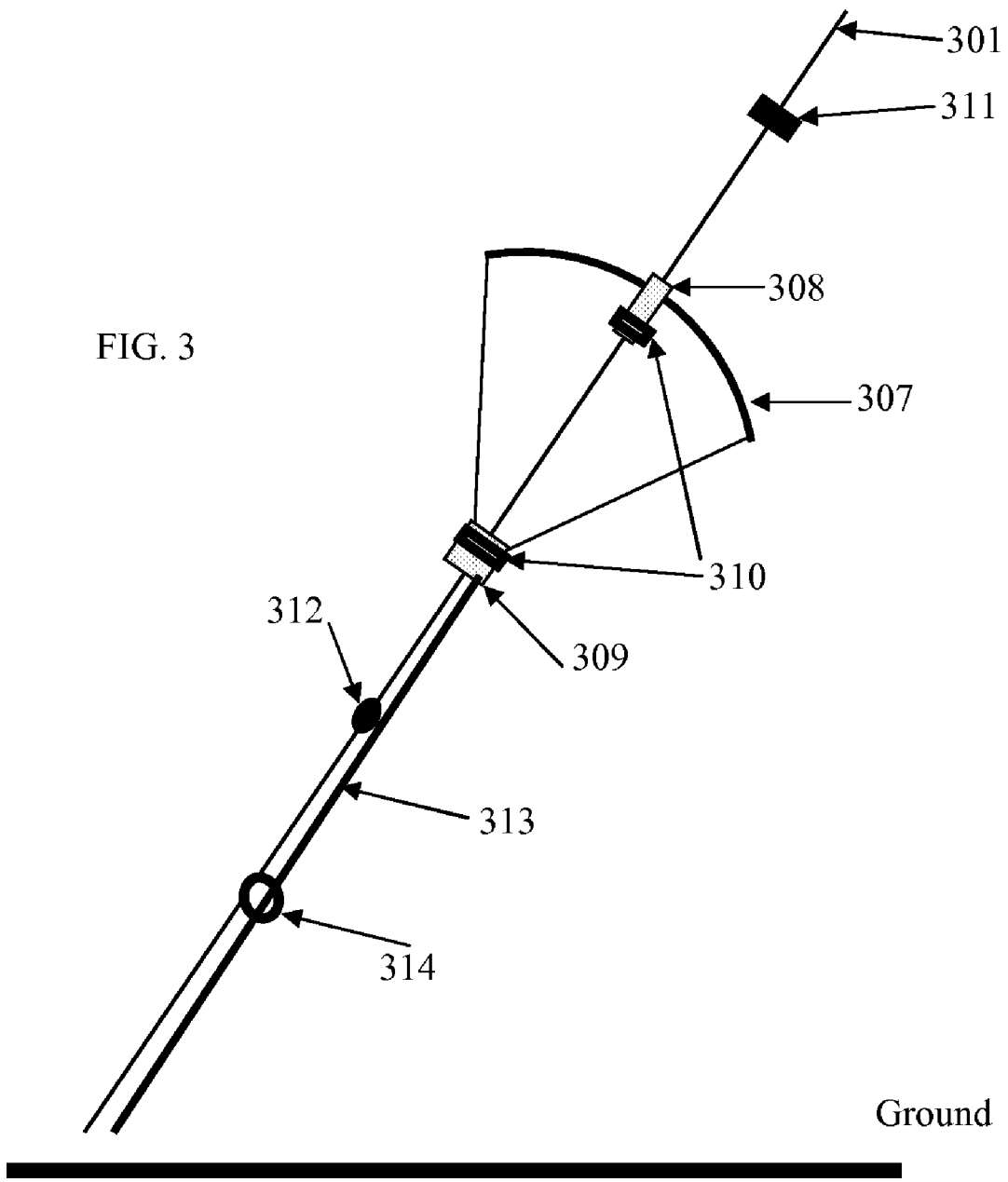
FIG. 3 shows an open-close mechanism for an airborne working umbrella, with the umbrella in an open state, in accordance with an embodiment of the invention.
Figure 4:
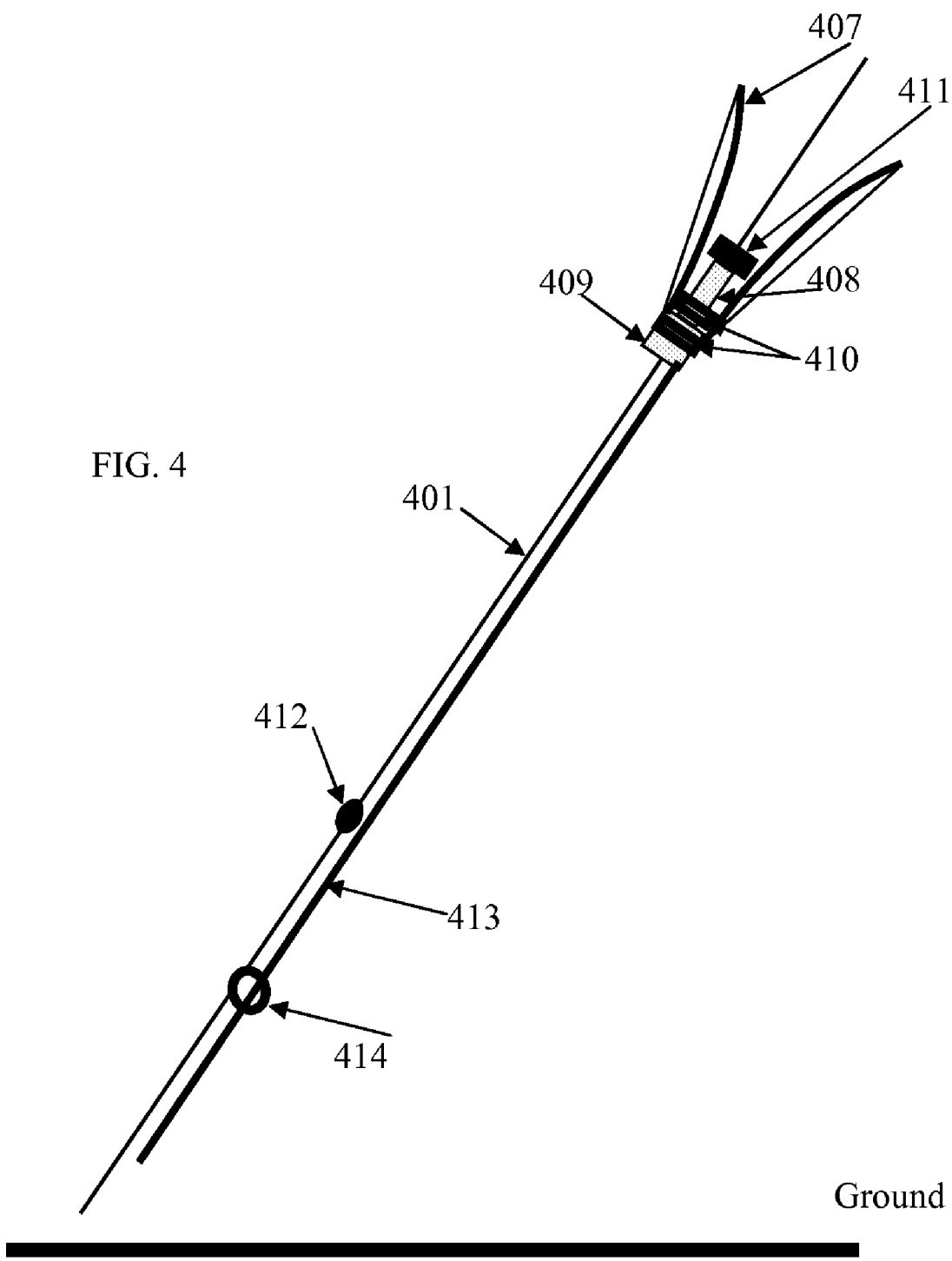
FIG. 4 show an open-close mechanism for an airborne working umbrella, with the umbrella in a closed state, in accordance with an embodiment of the invention.

FIGS. 3 and 4 show an open-close mechanism for an airborne working umbrella, in accordance with an embodiment of the invention. Referring to the embodiment of FIG. 3, a working umbrella 307 has two tubes 308 and 309 that allow the system tether 301 to pass through freely. The upper tube 308 is mounted at the center of the umbrella and the lower tube 309 binds together all of the perimeter strings of the working umbrella 307. Two magnets 310 are mounted on the two tubes, respectively. An upper stopper 311 and a lower stopper 312 are attached to the tether 301 at an upper location and a lower location relative to the umbrella 307, respectively. A separate umbrella tether 313 is connected with the lower tube 309 and is used to transmit the umbrella-induced pulling power to a mechanical mechanism on the ground for power generation. A ring-type clamp 314 keeps the two tethers 313 and 301 together but allows the umbrella tether 313 to pass through freely. The two stoppers 311 and 312 define the travel range, i.e., the working stroke, of the working umbrella 307. The upper stopper 311 stops the upper tube 308 from going further up the tether 301. The lower stopper 312 allows the lower tube 309 to pass through, but stops the upper tube 308 from moving further down the tether 301. Under certain wind conditions, the umbrella 307 opens and ascends automatically. The upper stopper 311 stops the upper tube 308, but the rest of the umbrella will keep moving up the tether 301 due to wind force and inertia force. The umbrella 307 will eventually flip over and pulls up the lower tube 309 to a position in contact with or close enough to the upper tube 308. Because of the attached magnets 310, the two tubes will now stick together so that the umbrella 307 will remain in a closed state.

The embodiment of FIG. 4 shows the umbrella 407 in a closed state, with like elements in FIGS. 3 and 4 being labeled with like reference numerals. When the umbrella 407 is in a closed state, its wind area is minimized and therefore it can be easily descended down the tether 401 by pulling/rewinding the umbrella tether 413. It will be appreciated that, as used herein, the term "closed" or "closed state" for an umbrella need not refer to the typical meaning of "closed" that is used for an ordinary umbrella. Instead, those terms are here intended to mean that an umbrella (such as umbrella 407 of the embodiment of FIG. 4) is in a state in which its wind area is reduced or minimized such that the umbrella can be more easily retracted against the direction of the wind (or in systems described below, the direction of the water current or other fluid current). Thus, for example, in FIG. 4, the closed state umbrella 407 is flipped over the upper stopper.

Figure 5:
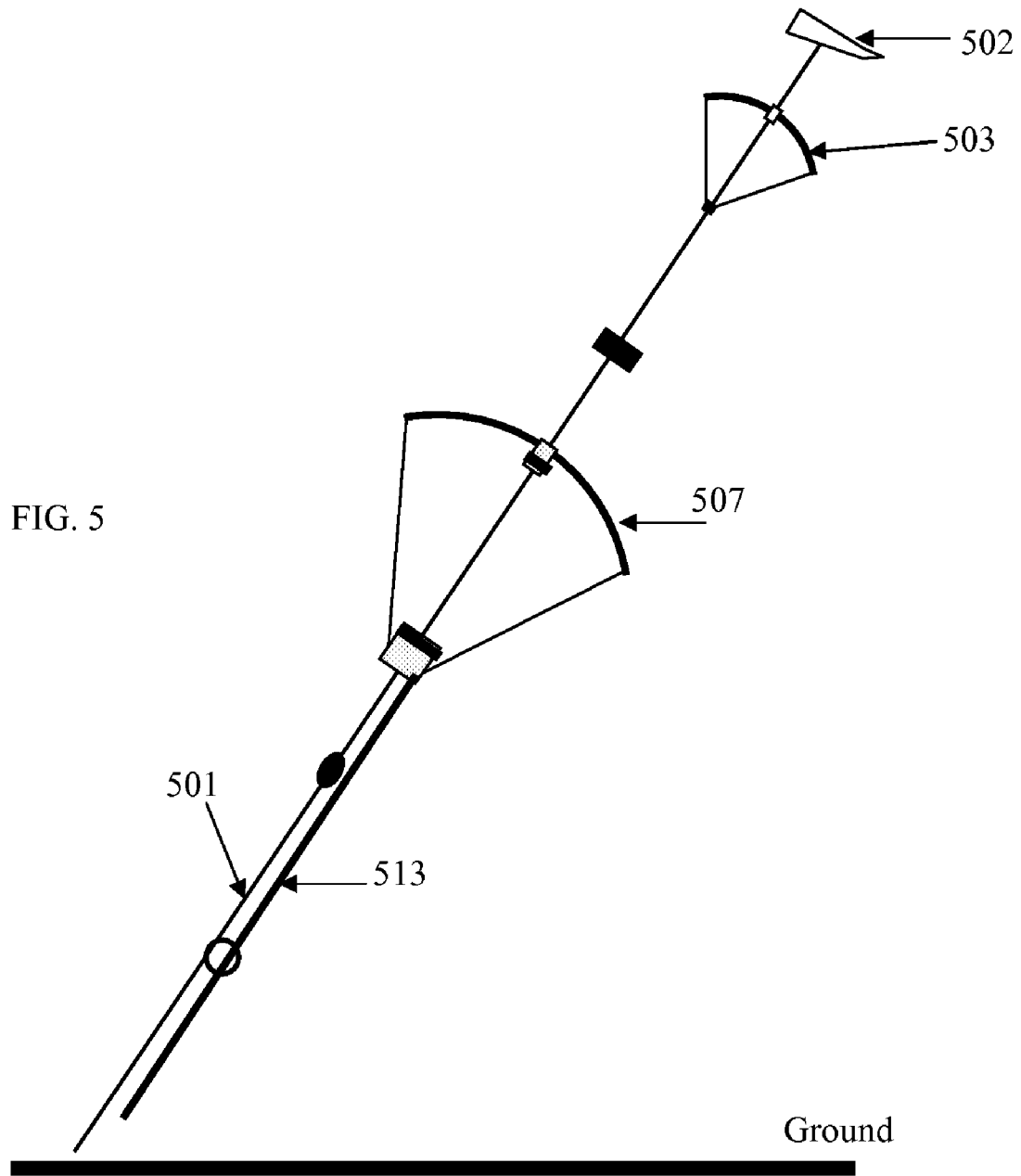
FIG. 5 shows an umbrella ladder system for power generation including a single working umbrella, in accordance with an embodiment of the invention.

In accordance with the embodiment of FIG. 5, the lower stopper 412 will let the lower tube 409 pass through but stop the upper tube 408. By further pulling down the umbrella tether 413, the two tubes will be forced to separate, and then the umbrella 407 will be opened again automatically by wind force under certain wind conditions, say a minimum of 3 m/s wind speed. Then the umbrella 407 starts another ascending cycle, thereby pulling on the working tether 413 and driving a rotor of a ground-based mechanism (or similar) for power generation. The working stroke of the umbrella 407 starts right above the lower stopper 412 and ends right below the upper stopper 411. The umbrella 407 recovers the initial position of its cycle by being pulled down when in a closed state.

In accordance with an embodiment of the invention, it should be noted that the magnetism of the two magnets 410 should be within a proper range: strong enough for reliably dragging down the closed-state umbrella, but not too strong to prevent relatively easy separation of the two tubes 408 and 409. It should also be noted that using magnets is just one of a few preferred methods and should not be taken as limiting; for example, one could use stick pads rather than magnets for the same purpose. Further, the manner of using stoppers 411 and 412 in the process of closing and opening the umbrella should not be taken as limiting. For example, the two tubes 408 and 409 could be separated by suddenly increasing the rewinding speed of the umbrella tether 413, so that the lower stopper 412 could be omitted or just used as a prevention mechanism. As another example, one could use a rope to serve the same purpose. The rope would have one end connected to the upper stopper 411 and another end to the upper tube 408 of the umbrella 407 and would have a length equal to the working stroke of the umbrella. After the rope has been fully extended, the two tubes 408 and 409 could be pulled apart by the rope and the umbrella tether 413, instead of by the lower stopper 412. It is further noted that the tubes 408 and 409 are one means for keeping the umbrella in track, i.e., sliding along the tether 401, but other means, such as chain wheels, could be used as well.

In accordance with an embodiment of the invention, a full traveling cycle of the working umbrella 407 comprises an ascending distance from the lower stopper 412 to the upper stopper 411 (the working stroke) and a descending distance from the upper stopper to the lower stopper (the recovery process). Although the descending distance is equal to the ascending distance, the recovery time may be much shorter than the working time, since the umbrella can be quickly dragged down without using a strong force when the umbrella is in a closed state.

FIG. 5 shows a relatively complete umbrella ladder system for power generation, in accordance with an embodiment of the invention, having a single working umbrella 507. The system comprises a guiding kite 502, a balancing umbrella 503, a working umbrella 507, a system tether or rail tether 501, and a working tether 513. Note that a ground portion of the system, which may include generators and gearing systems, is not shown in FIG. 5. The rail tether 501 is fixed at the ground and the working tether 513 may be reeled on a shaft that drives the rotor of a ground-based generator. The number of balancing umbrellas 503 may be more than one for keeping the working umbrella 507 stable. One disadvantage of the system shown in FIG. 5 is that the power generation will be interrupted in each full traveling cycle when the working umbrella 507 is descending (in a closed state).

Figure 6:
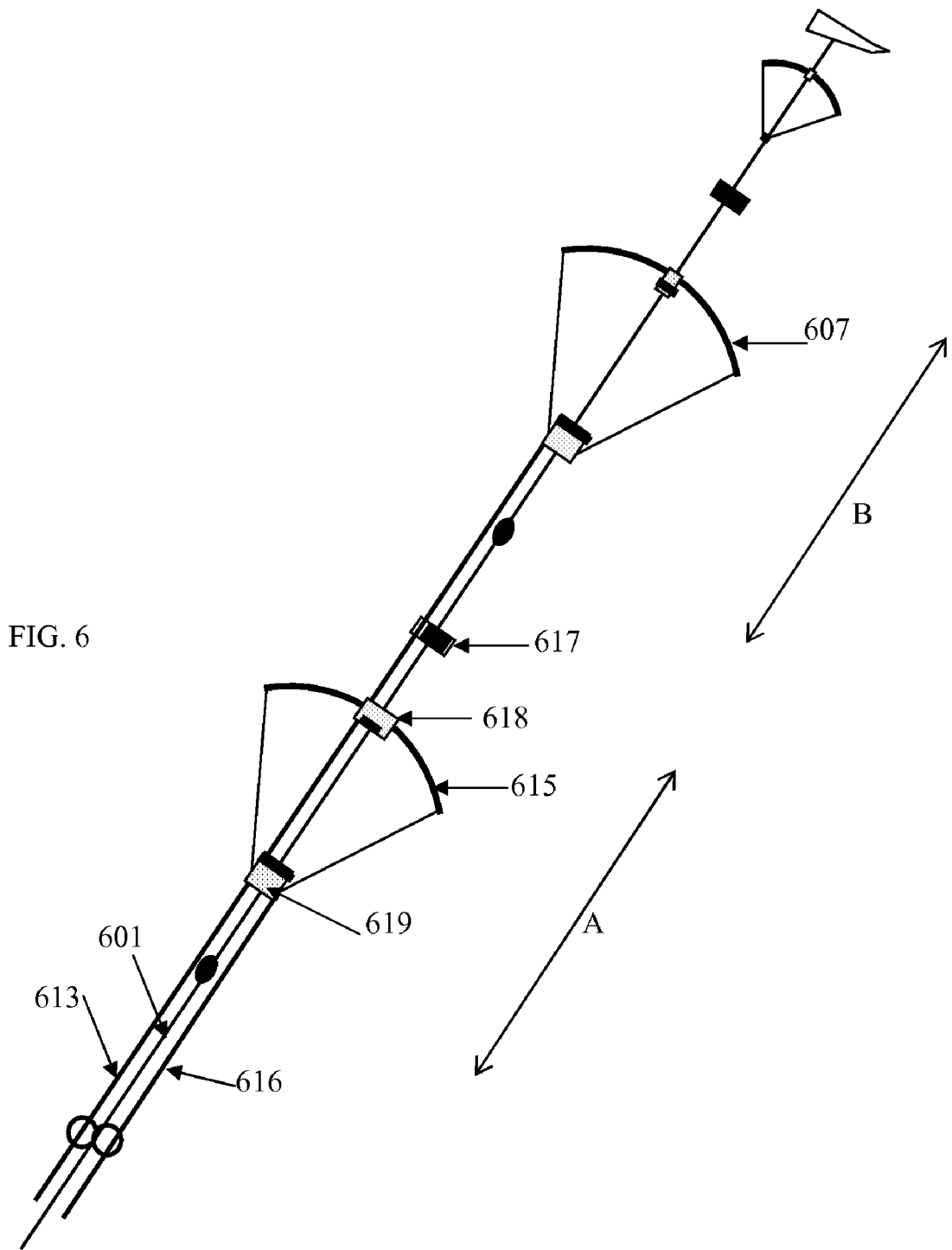
FIG. 6 shows an umbrella ladder system for power generation including more than one working umbrella, in accordance with an embodiment of the invention.

FIG. 6 shows an improved umbrella ladder system for power generation in accordance with an embodiment of the invention, which comprises more than one working umbrella—here, two working umbrellas 607 and 615. The ascending/descending timing of the two umbrellas should be adjusted so that they can compensate each other's non-working portion of their cycles. As shown in FIG. 6, working umbrella 615 travels in region A with working tether 616, while working umbrella 607 travels in region B with working tether 613. Working umbrella 615 and working umbrella 607 share the same rail tether 601, but will not contact each other. Because the tether 613 needs to pass through region A, the stopper 617 should have holes or other means for the tether 613 to travel through, or be small enough that it does not affect the movement of the tether 613. For the same reason, the upper and lower tubes 618 and 619 of the umbrella 615 should also have means for letting the tether 613 pass through freely.

In accordance with an embodiment of the invention, the number of working umbrellas on a single rail tether may be well above two. Because each working umbrella has its own working tether, adding more working umbrellas on a rail tether will not significantly increase the load on the rail tether. However, because the rail tether will suffer an impulse force from a working umbrella when the umbrella is suddenly stopped by its upper stopper, the cycles of all of the working umbrellas should be out of phase with each other so that they do not apply impulse forces on the rail tether at the same time. An appropriate separation should be used between the kite and the first umbrella in the system; for example, a 20 meter separation. The system may include a guide kite (or other airborne guidance device) that keeps the rail tether at an angle; at least one balancing umbrella, which is always open when there is wind and which has a fixed position on the rail tether; and at least one working umbrella that opens and closes as it moves in oscillating cycles up and down the rail tether. The defined spaces (A and B of FIG. 6) in which each working umbrella may work may be, for example, 500 feet, 1000 feet, or another distance in length. The ratio of the working portion of the cycle of a working umbrella to its recovery time may, for example, be 60% or greater working time versus 40% or less recovery time; or be 80% or greater working time versus 20% or less recovery time; or 90% or greater working time versus 10% or less recovery time; or another ratio.

In accordance with an embodiment of the invention, some advantages of using a kite-guided umbrella ladder system for power generation are:

(1) High power: a single rail tether may carry multiple working umbrellas, which results in wind power generation on a large scale, producing for example as much as 5 megawatts (MW) of power from one rail tether.

(2) Efficiency: the non-working time of each umbrella may be a very small portion of a cycle, for example 10% or less.

(3) Reliability: more working umbrellas will not add more load to the common rail tether. Each umbrella works independently and does not affect the others.

(4) Stability: the output of the system is the average of multiple working umbrellas. Further, the umbrella ladder system may be used at great heights above the ground, including for example using a rail tether that is more than 10,000 meters long, which allows harnessing the relatively consistent upper air wind energy.

(5) Much smaller ground footage compared to ground-based tower-type wind systems of equivalent power.

It should be appreciated that, although kite-guided systems are described above, it is also possible to use another airborne device to guide the system. For example, a balloon or even a motor-driven radio-controlled drone may be used in place of a kite to keep the rail tether at an angle to the wind, thereby guiding the system. One or more balancing umbrellas and one or more working umbrellas may be used in addition to such an airborne guidance device.

Figure 7:
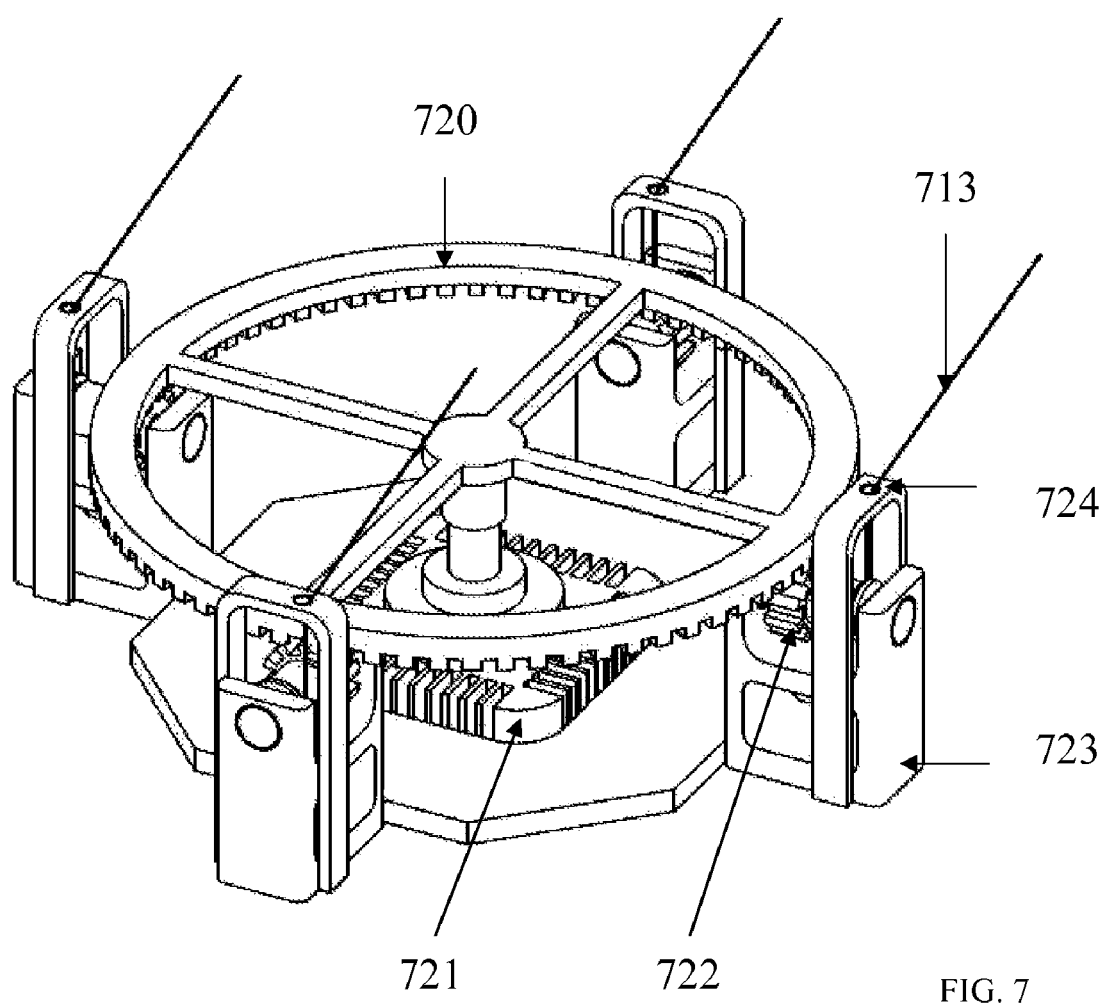
FIG. 7 shows a system combining multiple umbrella ladder systems to form a larger power generating system using a carousel style rotating stage, in accordance with an embodiment of the invention.

FIG. 7 shows a system combining multiple umbrella ladder systems to form a larger power generating system using a carousel style rotating stage, in accordance with an embodiment of the invention. In the example of FIG. 7, four umbrella ladder systems are used, although other numbers may be used. The embodiment of FIG. 7 includes a large-diameter rotating stage 720, a power generator 721, four gear assemblies 722, four firmly-fixed stands 723, four orientation frames 724, and four umbrella ladder systems, which are here shown only by their four working tethers 713. The center of the rotating stage 720 is connected with the shaft of the generator 721. The stage 720 is driven by the four working tethers 713 via the four gear assemblies 722. The four gear assemblies 722 are connected with planetary gear structures on the lower surface of the stage around the stage periphery. The orientation frames 724 are designed to keep the directions of the tether pulling force applied on the gear assemblies 722 unchanged, regardless of the wind direction and speed. It is desirable that the cycles of pulling and rewinding of the working tethers 713 are equally out of phase with each other in order to keep the stage rotation as smooth as possible.

Figure 8:
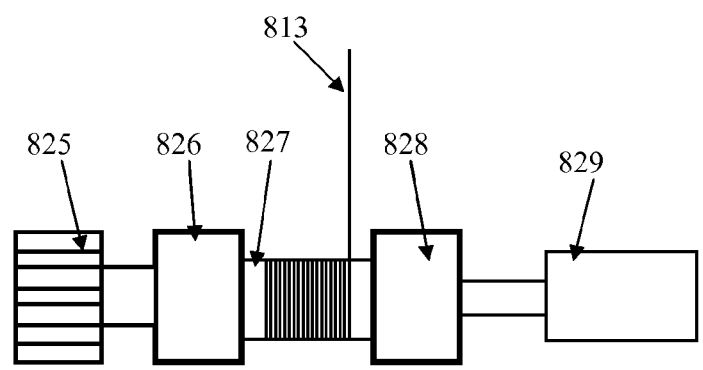
FIG. 8 shows a gear assembly that may be used in accordance with an embodiment of the invention.

FIG. 8 shows a gear assembly that may be used in accordance with an embodiment of the invention. As shown in FIG.

8, each gear assembly 722 (of FIG. 7) may include a gear wheel 825, a directional clutch 826, a shaft 827, another directional clutch 828, and a motor 829. The working tether 813 is tightly wound on the shaft 827 so that the tether's pulling power is transferred to the shaft 827. The directional clutch 826 connects or disconnects the shaft 827 to or from the gear wheel 825 when the working tether 813 is in the pulling or rewinding mode. Clutch 828 works similarly to clutch 826, and connects or disconnects the shaft 827 to or from the motor 829 when the tether is in the rewinding or pulling mode. The motor 829 is specifically prepared for rewinding the working tether 829 periodically. The gear wheel 825 may be directly connected to the planetary gear structures of the carousel stage 720 in FIG. 7, or via a gearbox that changes the gear rotation speed if necessary. It will be appreciated that other types of gearboxes and transmissions may be used in accordance with an embodiment of the invention; for example, a bicycle type transmission may be used.

Compared to a single umbrella ladder system, the carousel system of the embodiment of FIG. 7 not only greatly scales up power generation, but also may smooth out the power output of the system. Further, the carousel system may continue to generate power even when one or two individual umbrella ladder systems are not working for maintenance or other reasons. It will be appreciated that other mechanical arrangements may be used for combining multiple umbrella ladder systems.

In accordance with an embodiment of the invention, large working umbrellas may be used, for example 5-meters in diameter or more, or 10-meters in diameter or more, or 20-meters in diameter or more, or 30-meters in diameter or more. A working umbrella may generate about a 10-ton pulling force or more. There may be about 0.5 MW or more of power per working umbrella. Using umbrellas as large as 20-30 meters in diameter, with multiple working umbrellas, for example, it may be possible to generate on the order of 1 MW or more of power per rail tether. By combining multiple systems together, for example using the rotating stage of the embodiment of FIG. 7, it may be possible to generate 10 MW or more, 20 MW or more, or 100 MW or more from a combined system.

In accordance with an embodiment of the invention, automated control of systems described herein may be used. For example, mechanical, electrical, and/or computer-implemented automated control systems may be used to control operation of the working umbrellas, including controlling the length of the working stroke or recovery stroke of a working umbrella, the ratio of the working period to the recovery period of a working umbrella, the timing of when the working umbrella is rewound and/or released into its working phase, and the position of each working umbrella along the tether. For example, in the embodiment of FIG. 8, clutches 826 and 828 may be controlled by mechanical and/or electrical mechanisms, which may be controlled by computer systems, to implement any of the foregoing control operations. Further, the altitude and/or position of the working umbrellas may be optimized by the control system based on wind speeds at various altitudes and/or positions. Other control mechanisms may be used. For example, the kite or other airborne guidance device may be controlled by the control system, for example by radio control. Further, control systems may be used to communicate with other control systems that perform electrical power load balancing of a power grid to which the umbrella system is connected. In some embodiments, it may be useful to employ a camera or other sensor device mounted anywhere on the system in order to providing monitoring or feedback about the state of one or more system components, such as the working umbrellas. For example, a camera or other sensor component may provide information on whether a working umbrella or other component is open, closed, operating properly or needing maintenance. Control systems may be either entirely automated or accept human input via mechanical, electrical and/or computer system interfaces. Computer systems used in control may be specially programmed to control operation of the system.

Figure 9:
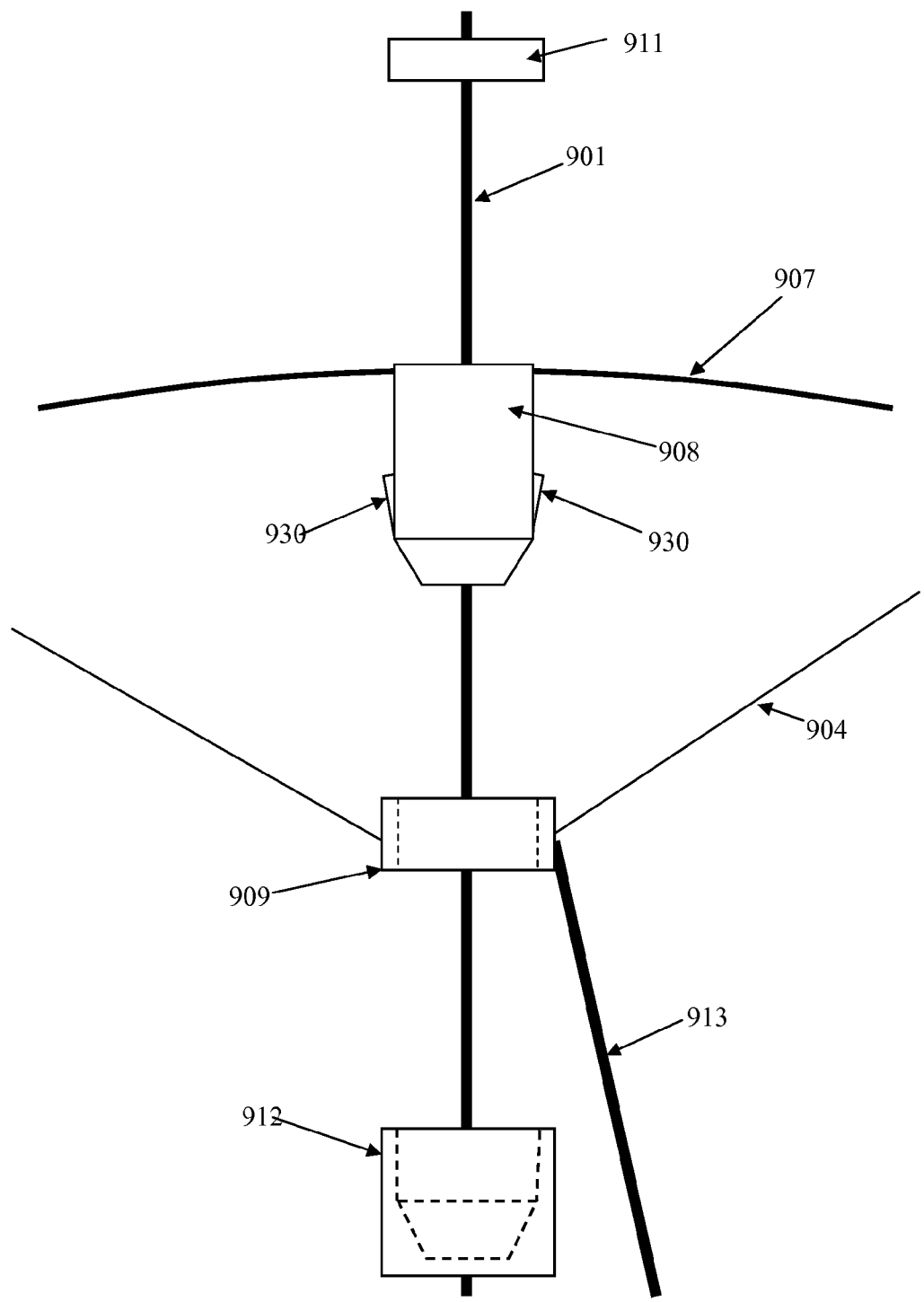
FIG. 9 is a diagram of an umbrella in working mode, with the umbrella opened and ascending, in a system that uses a movable tip open-close mechanism in accordance with an embodiment of the invention.

FIG. 9 is a diagram of an umbrella in working mode, with the umbrella opened and ascending, in a system that uses an alternative open-close mechanism in accordance with an embodiment of the invention. The system of FIG. 9 includes system tether 901, working umbrella body 907, upper stopper 911, lower stopper 912, lower slider 909, upper slider 908, working tether 913 and umbrella peripheral strings 904. Like numerals are used in the embodiments of FIGS. 10 and 11. It will be appreciated that although the terms "lower slider" and "upper slider" as used in connection with the embodiments of FIGS. 9-11 are used to refer to similar items to those referred to as the "lower tube" and "upper tube" elsewhere herein, these items need not necessarily take the form of a tube—other shapes of sliders may be used in accordance with an embodiment of the invention.

In accordance with the embodiment of FIG. 9, the upper slider 908 has at least a movable tip 930 on its side wall. The top portion of such a movable tip 930 is always popped out if not restricted by other parts and could be squeezed back into the side wall easily. This can be realized by making the tip 930 itself as a spring or by using a separate spring to push the top portion of the tip 930 outward. FIG. 9 shows the working umbrella 907 in ascending working mode.

Figure 10:
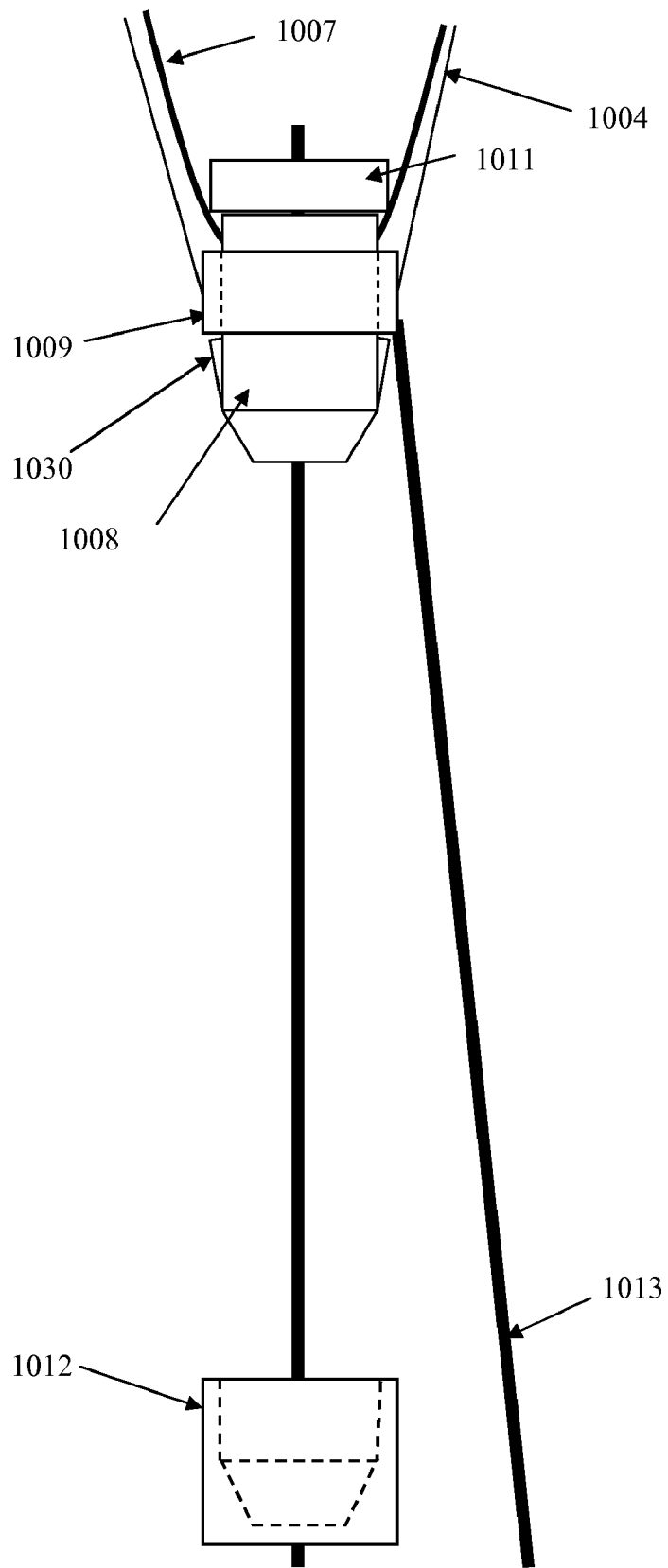
FIG. 10 is a diagram of an umbrella stopped by an upper stopper and ready to descend, in accordance with an embodiment of the invention.

FIG. 10 is a diagram of the working umbrella 1007 stopped by an upper stopper 1011 and ready to descend, in accordance with the embodiment of FIG. 9. FIG. 10 shows that the upper slider 1008 is stopped by the upper stopper 1011 and the umbrella soft body 1007, except its central portion, continues moving up and drags the lower slider 1009 upward. The lower slider 1009 eventually engages with the upper slider 1008 and squeezes the movable tips 1030 into the wall of the upper slider and is finally stopped by umbrella body 1007 or the upper stopper 1011. Once the lower slider 1009 has moved up and past the movable tips 1030, the top portions of the tips 1030 will pop out again automatically, thereby preventing the umbrella 1007 from being opened. The whole umbrella 1007 can then be easily pulled down by rewinding the working tether 1013. The upper slider 1008 and the lower slider 1009 will keep engaged while being pulled down until being stopped by the lower stopper 1012.

Figure 11:
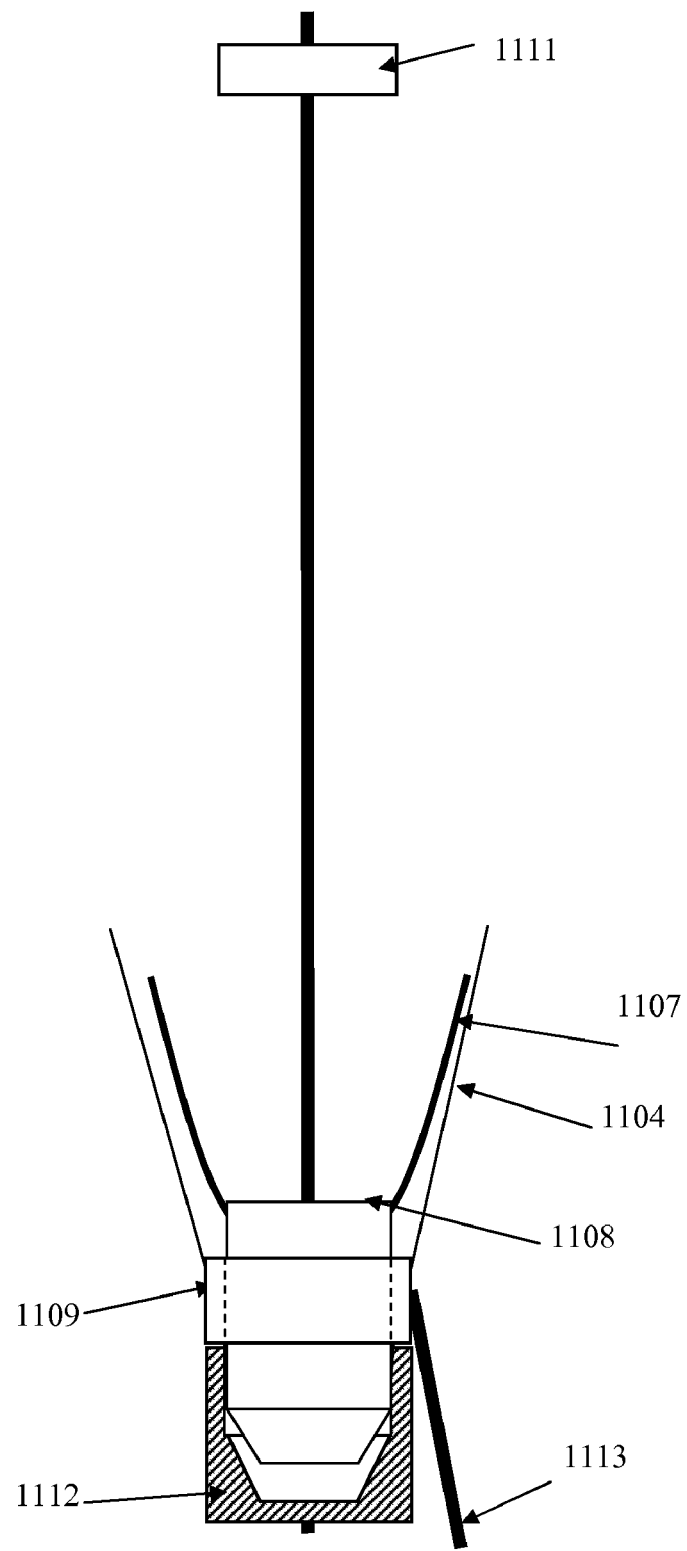
FIG. 11 is a diagram of an umbrella getting back to its starting point and ready to open for the next working cycle, in accordance with an embodiment of the invention.

FIG. 11 is a diagram of the working umbrella 1107 getting back to the starting point and ready to open for the next working cycle, in accordance with the embodiment of FIG. 9. As shown in FIG. 11, the lower portion of the upper slider 1108 is now engaged with the lower stopper 1112 and the movable tips 1030 (see FIG. 10) are being squeezed in by the lower stopper. At this point the upper slider 1108 is free to be separated from the lower slider 1109 by moving upward. The working umbrella 1107 will be automatically opened again by wind force, thereby beginning the next working cycle.

In accordance with an embodiment of the invention, an umbrella wind power system such as those described herein may be used for high altitude wind power generation. For example, the rail tether may be 500 meters or greater in length; including 2000 meters or greater in length; or 4000 meters or greater in length, or 7000 meters or greater in length, or 10,000 meters or greater in length. Such use provides the advantage of harnessing the strong and consistent winds that occur at high altitudes. However, the system need not be used at such altitudes; other lengths of system may be used.

In accordance with a further embodiment of the invention, there is provided an umbrella ladder system for efficiently harnessing the energy of water currents for clean energy power generation. In a similar fashion to the wind systems set forth above, such an embodiment uses an umbrella ladder system for power generation from the harnessing of water currents, for example currents in oceans, rivers, streams or other bodies of water.

Figure 12:
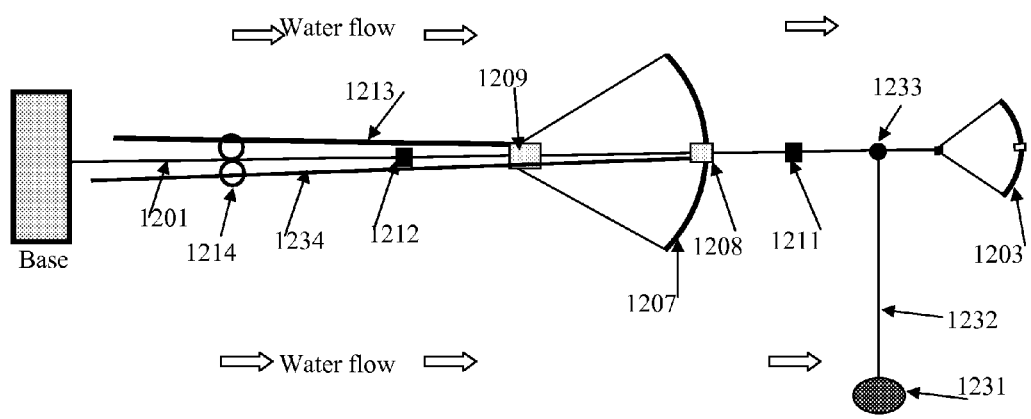
FIG. 12 shows an umbrella ladder system for harnessing the energy of water currents, in accordance with an embodiment of the invention.

FIG. 12 shows an umbrella ladder system 1200 for harnessing the energy of water currents, in accordance with an embodiment of the invention. The umbrella ladder system 1200 comprises a common rail tether 1201, a balancing umbrella 1203, and a working umbrella 1207. The rail tether 1201 is firmly bound on a base, which may include a generator and other mechanics and electronics. The balancing umbrella 1203 is for keeping the rail tether 1201 straight. The working umbrella 1207 is hung on the rail tether 1201 through a front tube 1209 and a back tube 1208. All the perimeter strings of the working umbrella 1207 are bound on the front tube 1209. The working umbrella can slide along the rail tether 1201 and its movement range is limited by a front stopper 1212 and a back stopper 1211 mounted on the rail tether 1201. The front tube 1209 and the back tube 1208 are, respectively, connected with a working tether 1213 and a control tether 1234. Ring-type clamps 1214 are equipped on the rail tether 1201 for keeping the working tether 1213 and the control tether 1234 in place. The ladder system 1200 is kept underwater by a weight 1231, which is hung via a rope 1232 at a proper location 1233 near the balancing umbrella 1203.

In accordance with the embodiment of FIG. 12, the working cycle of the working umbrella is as follows. When the control tether 1234 is loose, the working umbrella 1207 is opened by the strength of water flow and generates a strong pulling power on the working tether 1213, which is wound on a shaft or the similar for driving a generator (not shown). The working umbrella 1207 pulls the working tether 1213 and moves farther away from the front stopper 1212 until the back tube 1208 is stopped by the back stopper 1211. Because of water flow and inertia force, the front tube 1209 continues moving closer to the back tube 1208 so that the effective stress area of the working umbrella 1207 is reduced dramatically. Therefore, the working umbrella 1207 is relatively easily pulled back to the front stopper 1212 by the control tether 1234, which is connected with the back tube 1208. At the same time, the working tether 1213 is rewound to be ready for the next working cycle. The whole working cycle includes a working stroke and a recovery trip. The working stroke starts at the front stopper 1212 and ends at the back stopper 1211, and the recovery trip starts at the back stopper 1211 and ends at the front stopper 1212. Although the recovery distance is the same as the working distance, the recovery time could be much shorter than the working time. The material of the umbrellas should be durable and flexible. The shape of the umbrellas is preferred, but not limited, to be round or polygon, such as hexagon or octagon. The number of either the working umbrella or the balancing umbrella is not limited to one. When there is more than one working umbrella, the non-working recovery period of one working umbrella could be covered by the working period of another umbrella. It should be noted that the working cycles of multiple working umbrellas should be out of phase with each other so that the timings of reaching the correspondent back stoppers will be different, in order to avoid applying impulsive forces on the rail tether at the same time. In accordance with an embodiment of the invention, the use of water power may have an increased power output relative to a similar wind system because of the increased density of water compared to air. A water system need not use as long a rail tether as a high altitude wind system. Multiple water systems may be combined, in an analogous fashion to the use of the carousel and gearbox system of FIGS. 7 and 8, above. Similar control systems may be used as described above for wind systems. The system may include at least a weight to maintain at least a portion of the system underwater, such as at least a portion of the working umbrella. At least one of the working umbrella and a balancing umbrella may be shaped to permit passage of waterborne objects through at least a portion of an interior of the at least one of the working umbrella and the balancing umbrella. For example, each umbrella (either a balancing umbrella or a working umbrella) may have at least a hole with proper diameter near its center (or outside of its center) to avoid the trapping of trash or fish in the umbrella.

While this invention has been particularly shown and described with references to example embodiments thereof, it will be understood by those skilled in the art that various changes in form and details may be made therein without departing from the scope of the invention encompassed by the appended claims.

What is claimed is:

1. A system for power generation from a fluid, the system comprising:
    a rail tether;
    a working umbrella movably mounted to the rail tether such that the working umbrella is powered by the fluid in a first direction along the rail tether during a working stroke of the working umbrella;
    a working tether coupling the working umbrella to a generator during at least the working stroke of the working umbrella; and
    a motor coupled to the working umbrella during at least a recovery stroke of the working umbrella, the recovery stroke being in an opposite direction to the first direction along the rail tether.

2. A system according to claim 1, wherein the fluid comprises at least one of air and water.

3. A system according to claim 1, comprising more than one working umbrella movably mounted to the rail tether, each working umbrella being coupled to its own working tether during at least a working stroke of each working umbrella and being coupled to at least one motor during at least a recovery stroke of each working umbrella.

4. A system according to claim 1, further comprising an airborne guidance device coupled to the rail tether.

5. A system according to claim 1, further comprising a balancing umbrella, the balancing umbrella being fixed in position along the rail tether.

6. A system according to claim 1, further comprising a mechanism to close the working umbrella at the end of the working stroke.

7. A system according to claim 6, wherein the mechanism to close the working umbrella comprises:
    an upper stopper;
    an upper slider coupled to a center of the working umbrella; and
    a lower slider coupled to at least one string of a periphery of the working umbrella.

8. A system according to claim 7, wherein the upper slider comprises a magnet and the lower slider comprises a magnet.

9. A system according to claim 7, wherein the upper slider comprises a movable tip mechanism.

10. A system according to claim 1, further comprising a mechanism to open the working umbrella at the beginning of the working stroke.

11. A system according to claim 10, wherein the mechanism to open the working umbrella comprises:
- a lower stopper;
- a lower slider coupled to at least one string of a periphery of the working umbrella; and
- an upper slider coupled to a center of the working umbrella.

12. A system according to claim 11, wherein the upper slider comprises a magnet and the lower slider comprises a magnet.

13. A system according to claim 11, wherein the upper slider comprises a movable tip mechanism.

14. A system according to claim 11, wherein the lower stopper is dimensioned to allow the lower slider to pass by the lower stopper along the rail tether, but to prevent the upper slider from passing by the lower stopper along the rail tether.

15. A system according to claim 14, wherein an upper stopper is dimensioned to prevent the upper slider from passing by the upper stopper along the rail tether.

16. A system according to claim 1, wherein a time taken for the working stroke is at least one of 60% or greater of the total time of the working stroke plus the recovery stroke, 80% or greater of the total time of the working stroke plus the recovery stroke and 90% or greater of the total time of the working stroke plus the recovery stroke.

17. A system according to claim 1, the system comprising more than one rail tether coupled to at least one generator, each rail tether comprising:
- a working umbrella movably mounted to each rail tether such that each working umbrella is powered by the fluid in a first direction along each rail tether during a working stroke of each working umbrella;
- a working tether coupling each working umbrella to the at least one generator during at least the working stroke of each working umbrella; and
- at least one motor coupled to each working umbrella during at least a recovery stroke of each working umbrella, the recovery stroke of each working umbrella being in an opposite direction to the first direction along the rail tether.

18. A system according to claim 17, the system comprising a rotating stage coupled to the more than one rail tether.

19. A system according to claim 1, further comprising a gearbox coupled to the working tether, the gearbox comprising at least one clutch.

20. A system according to claim 19, wherein the gearbox comprises a directional clutch to couple the working tether to the generator during the working stroke, and a clutch to couple the motor to the working umbrella during the recovery stroke.

21. A system according to claim 1, wherein the working umbrella comprises a diameter of at least one of: at least 5 meters and at least 10 meters.

22. A system according to claim 1, wherein the system generates at least one of 0.5 MW or more of power, 1 MW or more of power, and 10 MW or more of power.

23. A system according to claim 1, further comprising an automated control system to control at least one of a length of the working stroke, a length of the recovery stroke, timing of the commencing of the working stroke, timing of the commencing of the recovery stroke, position of the working umbrella along the rail tether, and load balancing of the power delivered by the system.

24. A system according to claim 1, wherein the rail tether is one of: at least 500 meters in length, at least 2000 meters in length, at least 4000 meters in length, at least 7000 meters in length, and at least 10,000 meters in length.

25. A system according to claim 1, further comprising a control tether coupled to the working umbrella.

26. A system according to claim 1, wherein the fluid comprises water, the system further comprising at least a weight to maintain at least a portion of the system underwater.

27. A system according to claim 1, wherein the fluid comprises water, and wherein at least one of the working umbrella and a balancing umbrella is shaped to permit passage of waterborne objects through at least a portion of an interior of the at least one of the working umbrella and the balancing umbrella.

28. A method for power generation from a fluid, the method comprising:
- coupling a working umbrella to a generator with a working tether during at least a working stroke of the working umbrella, the working umbrella being movably mounted to a rail tether such that the working umbrella is powered by the fluid in a first direction along the rail tether during a working stroke of the working umbrella; and
- coupling a motor to the working umbrella during at least a recovery stroke of the working umbrella, the recovery stroke being in an opposite direction to the first direction along the rail tether.

29. A method according to claim 28, wherein the fluid comprises at least one of air and water.

30. A method according to claim 28, wherein more than one working umbrella is movably mounted to the rail tether, the comprising coupling each working umbrella to its own working tether during at least a working stroke of each working umbrella and coupling each working umbrella to at least one motor during at least a recovery stroke of each working umbrella.

31. A method according to claim 28, further comprising guiding the rail tether with an airborne guidance device.

32. A method according to claim 28, further comprising stabilizing the rail tether with a balancing umbrella, the balancing umbrella being fixed in position along the rail tether.

33. A method according to claim 28, further comprising using a mechanism to close the working umbrella at the end of the working stroke.

34. A method according to claim 33, wherein the mechanism to close the working umbrella comprises:
- an upper stopper;
- an upper slider coupled to a center of the working umbrella; and
- a lower slider coupled to at least one string of a periphery of the working umbrella.

35. A method according to claim 34, wherein the upper slider comprises a magnet and the lower slider comprises a magnet.

36. A method according to claim 34, wherein the upper slider comprises a movable tip mechanism.

37. A method according to claim 28, further comprising using a mechanism to open the working umbrella at the beginning of the working stroke.

38. A method according to claim 37, wherein the mechanism to open the working umbrella comprises:
- a lower stopper;
- a lower slider coupled to at least one string of a periphery of the working umbrella; and
- an upper slider coupled to a center of the working umbrella.

39. A method according to claim 38, wherein the upper slider comprises a magnet and the lower slider comprises a magnet.

40. A method according to claim 38, wherein the upper slider comprises a movable tip mechanism.

41. A method according to claim 38, wherein the lower stopper is dimensioned to allow the lower slider to pass by the lower stopper along the rail tether, but to prevent the upper slider from passing by the lower stopper along the rail tether.

42. A method according to claim 41, wherein an upper stopper is dimensioned to prevent the upper slider from passing by the upper stopper along the rail tether.

43. A method according to claim 28, wherein a time taken for the working stroke is at least one of 60% or greater of the total time of the working stroke plus the recovery stroke, 80% or greater of the total time of the working stroke plus the recovery stroke and 90% or greater of the total time of the working stroke plus the recovery stroke.

44. A method according to claim 28, the method comprising coupling more than one rail tether to at least one generator, coupling each rail tether comprising:
coupling each working umbrella to the at least one generator with a working tether during at least a working stroke of each working umbrella, each working umbrella being movably mounted to its rail tether such that each working umbrella is powered by the fluid in a first direction along its rail tether during a working stroke of each working umbrella; and
coupling a motor to each working umbrella during at least a recovery stroke of each working umbrella, the recovery stroke being in an opposite direction to the first direction along each rail tether.

45. A method according to claim 44, comprising coupling the more than one rail tether to a rotating stage.

46. A method according to claim 28, further comprising coupling a gearbox to the working tether, the gearbox comprising at least one clutch.

47. A method according to claim 46, comprising using a directional clutch to couple the working tether to the generator during the working stroke, and using a clutch to couple the motor to the working umbrella during the recovery stroke.

48. A method according to claim 28, wherein the working umbrella comprises a diameter of at least one of: at least 5 meters and at least 10 meters.

49. A method according to claim 28, comprising generating at least one of 0.5 MW or more or power, 1 MW or more of power and 10 MW or more of power.

50. A method according to claim 28, further comprising using an automated control system to control at least one of a length of the working stroke, a length of the recovery stroke, timing of the commencing of the working stroke, timing of the commencing of the recovery stroke, position of the working umbrella along the rail tether, and load balancing of the power delivered by the system.

51. A method according to claim 28, wherein the rail tether is one of: at least 500 meters in length, at least 2000 meters in length, at least 4000 meters in length, at least 7000 meters in length, and at least 10,000 meters in length.

52. A method according to claim 28, further comprising coupling a control tether to the working umbrella.

53. A method according to claim 28, wherein the fluid comprises water, the method further comprising using at least a weight to maintain at least a portion of the working umbrella underwater.

54. A method according to claim 28, wherein the fluid comprises water, further comprising permitting passage of waterborne objects through at least a portion of an interior of at least one of the working umbrella and a balancing umbrella.

55. A system for power generation from a fluid, the system comprising:
a rail tether means for movably mounting a working umbrella means; and
the working umbrella means movably mounted to the rail tether means for being powered by the fluid in a first direction along the rail tether means during a working stroke of the working umbrella means;
a working tether means for coupling the working umbrella means to a generator during at least the working stroke of the working umbrella means; and
a motor coupled to the working umbrella means during at least a recovery stroke of the working umbrella means, the recovery stroke being in an opposite direction to the first direction along the rail tether means.

56. A system according to claim 55, wherein the fluid comprises at least one of air and water.

57. A system according to claim 55, comprising more than one working umbrella means movably mounted to the rail tether means, each working umbrella means being for coupling to its own working tether means during at least a working stroke of each working umbrella means and being for coupling to at least one motor during at least a recovery stroke of each working umbrella means.

58. A system according to claim 55, further comprising a means for closing the working umbrella at the end of the working stroke.

59. A system according to claim 55, further comprising a means for opening the working umbrella at the beginning of the working stroke.

60. A system for power generation from a fluid, the system comprising:
a rail tether;
a working umbrella movably mountable to the rail tether such that the working umbrella is powered by the fluid in a first direction along the rail tether during a working stroke of the working umbrella; and
a working tether, the working umbrella being couplable to a generator by the working tether during at least a working stroke of the working umbrella, and being couplable to a motor by the working tether during at least a recovery stroke of the working umbrella, the recovery stroke being in an opposite direction to the first direction along the rail tether.

* * * * *